(No Model.) 8 Sheets—Sheet 1.
F. P. CADY.
MACHINE FOR MAKING SPLIT KEYS.
No. 551,887. Patented Dec. 24, 1895.
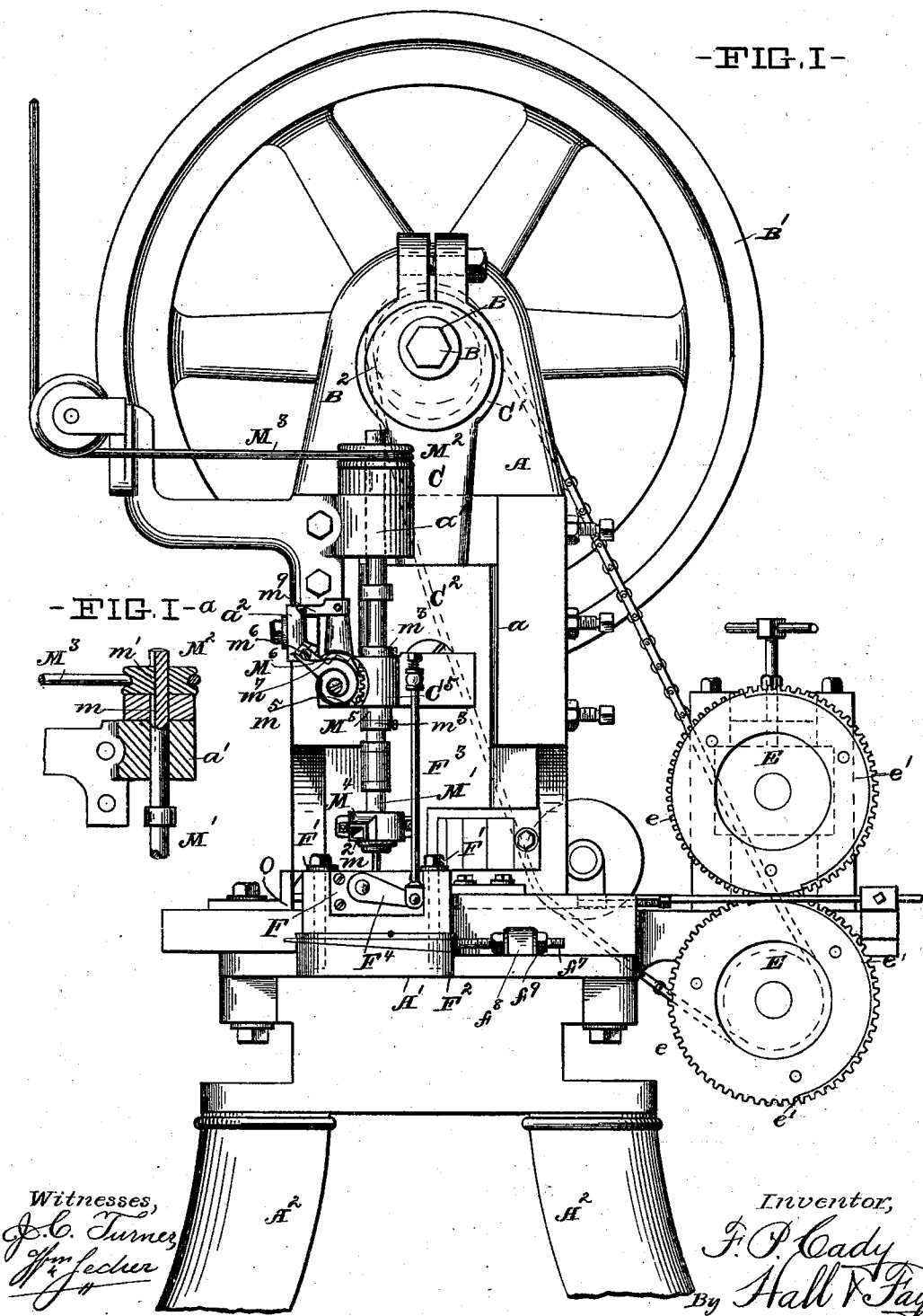
-FIG. I-
-FIG. I-a
Witnesses,
J. C. Turner
Wm Fecher
Inventor,
F. P. Cady
By Hall & Fay
Attys.

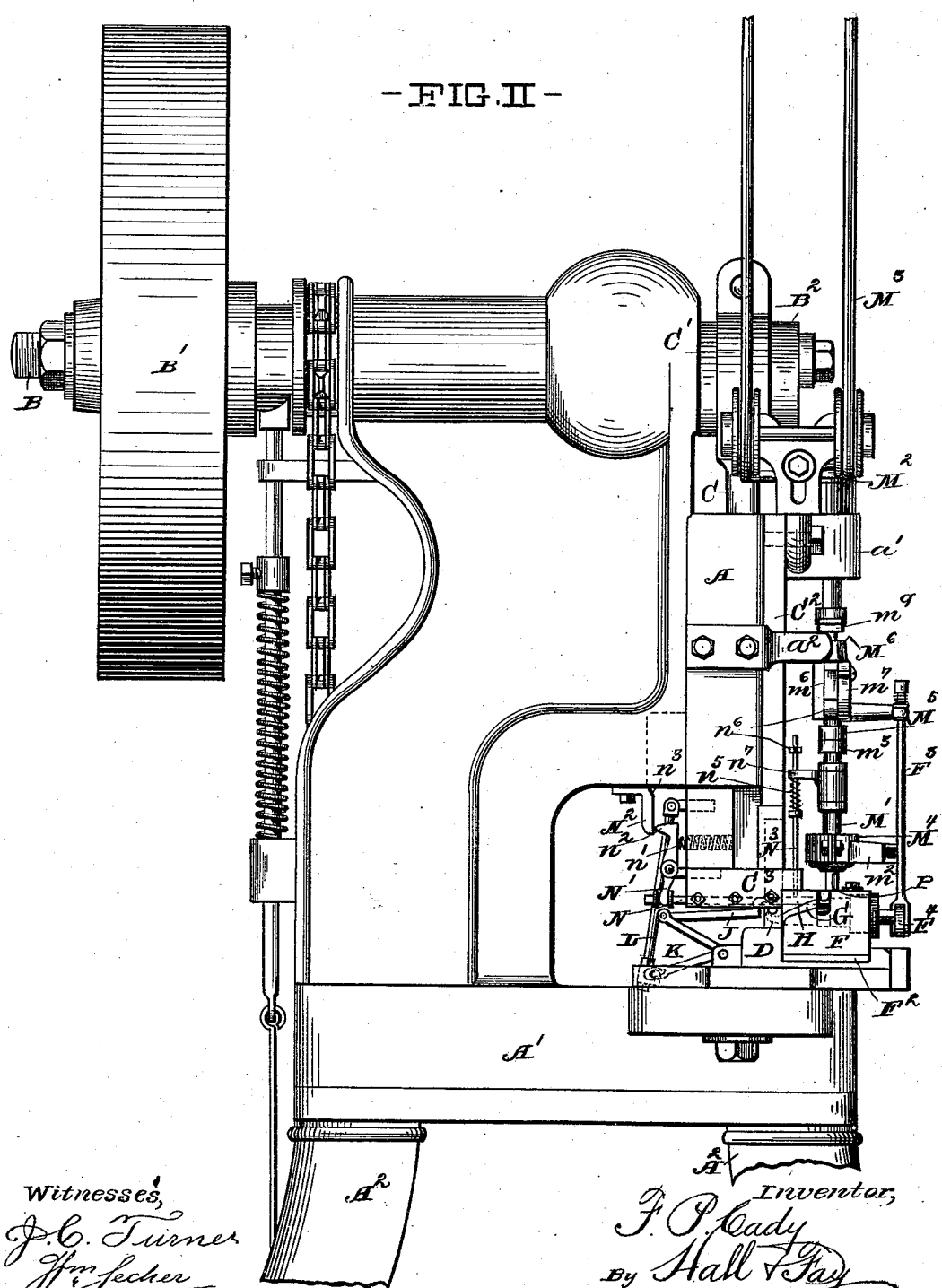

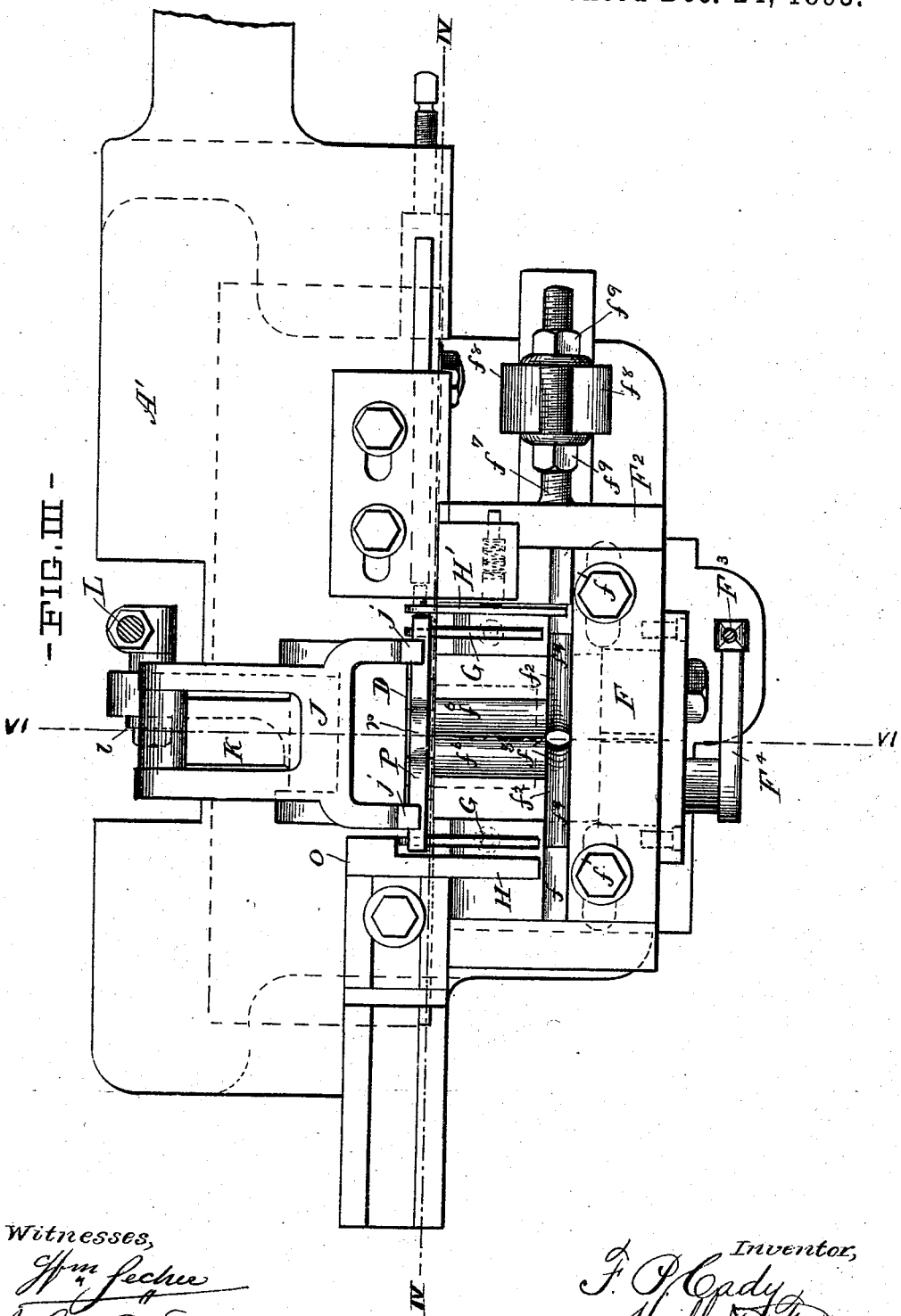

(No Model.) 8 Sheets—Sheet 4.
F. P. CADY.
MACHINE FOR MAKING SPLIT KEYS.
No. 551,887. Patented Dec. 24, 1895.
- FIG. IV -
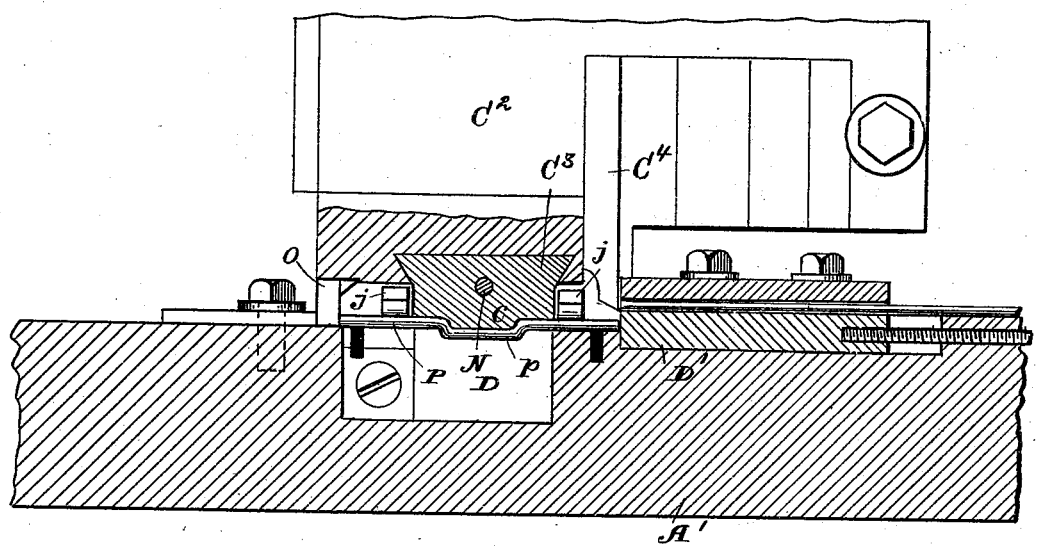
- FIG. V -
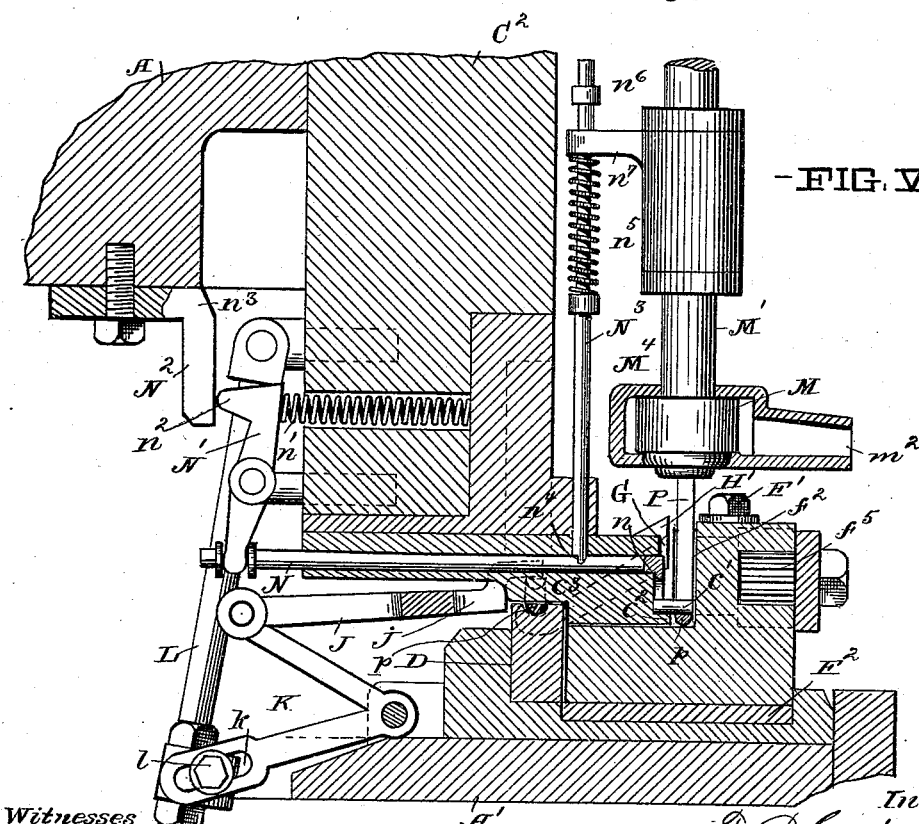
Witnesses  
Inventor,  
F. P. Cady  
By Hall & Fay  
Atty's.

(No Model.) 8 Sheets—Sheet 5.
F. P. CADY.
MACHINE FOR MAKING SPLIT KEYS.
No. 551,887. Patented Dec. 24, 1895.
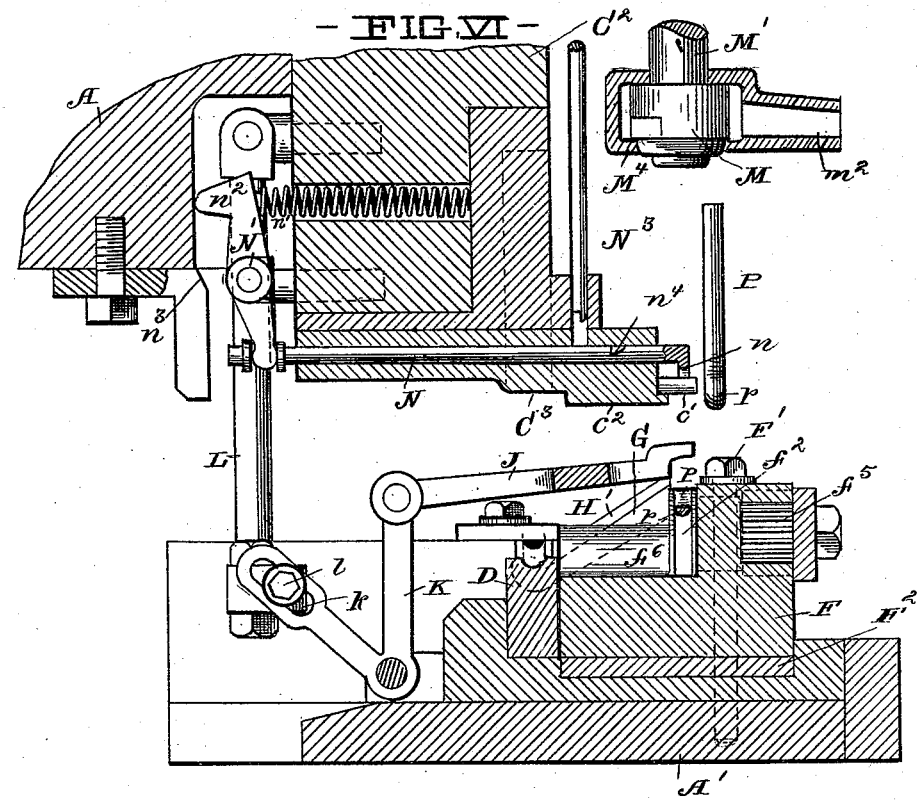
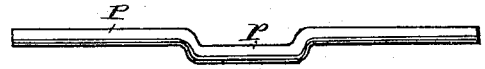
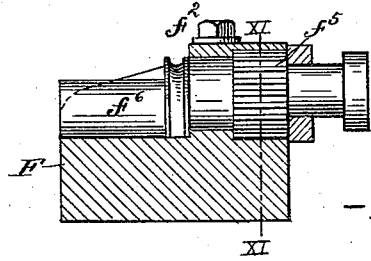
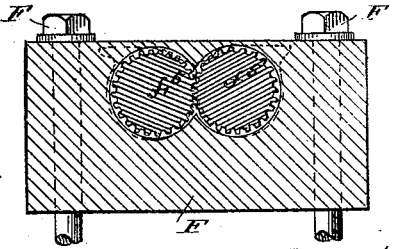
Witnesses,
Inventor
F. P. Cady
By Hall & Fay
Attys.

(No Model.) 8 Sheets—Sheet 6.
F. P. CADY.
MACHINE FOR MAKING SPLIT KEYS.
No. 551,887. Patented Dec. 24, 1895.
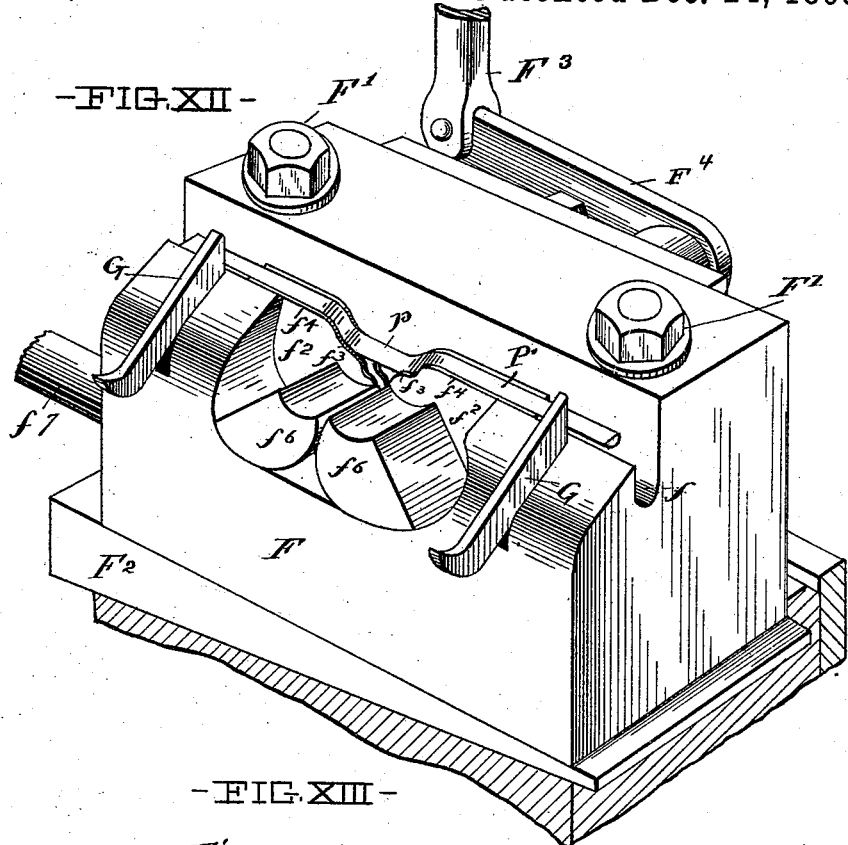
-FIG. XII-
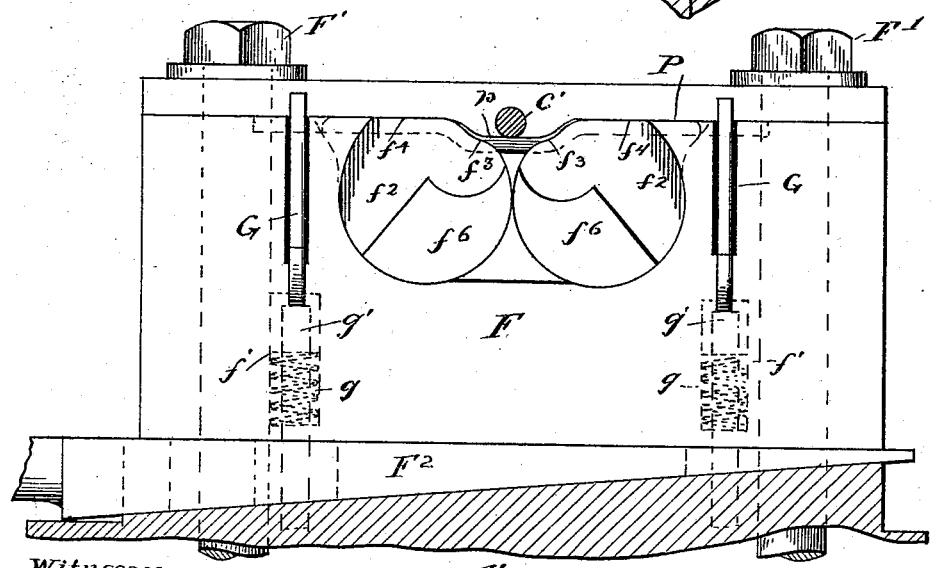
-FIG. XIII-
Witnesses,
J. C. Turner
Wm. Fecher
Inventor,
F. P. Cady
By Hall & Fay
Atty's

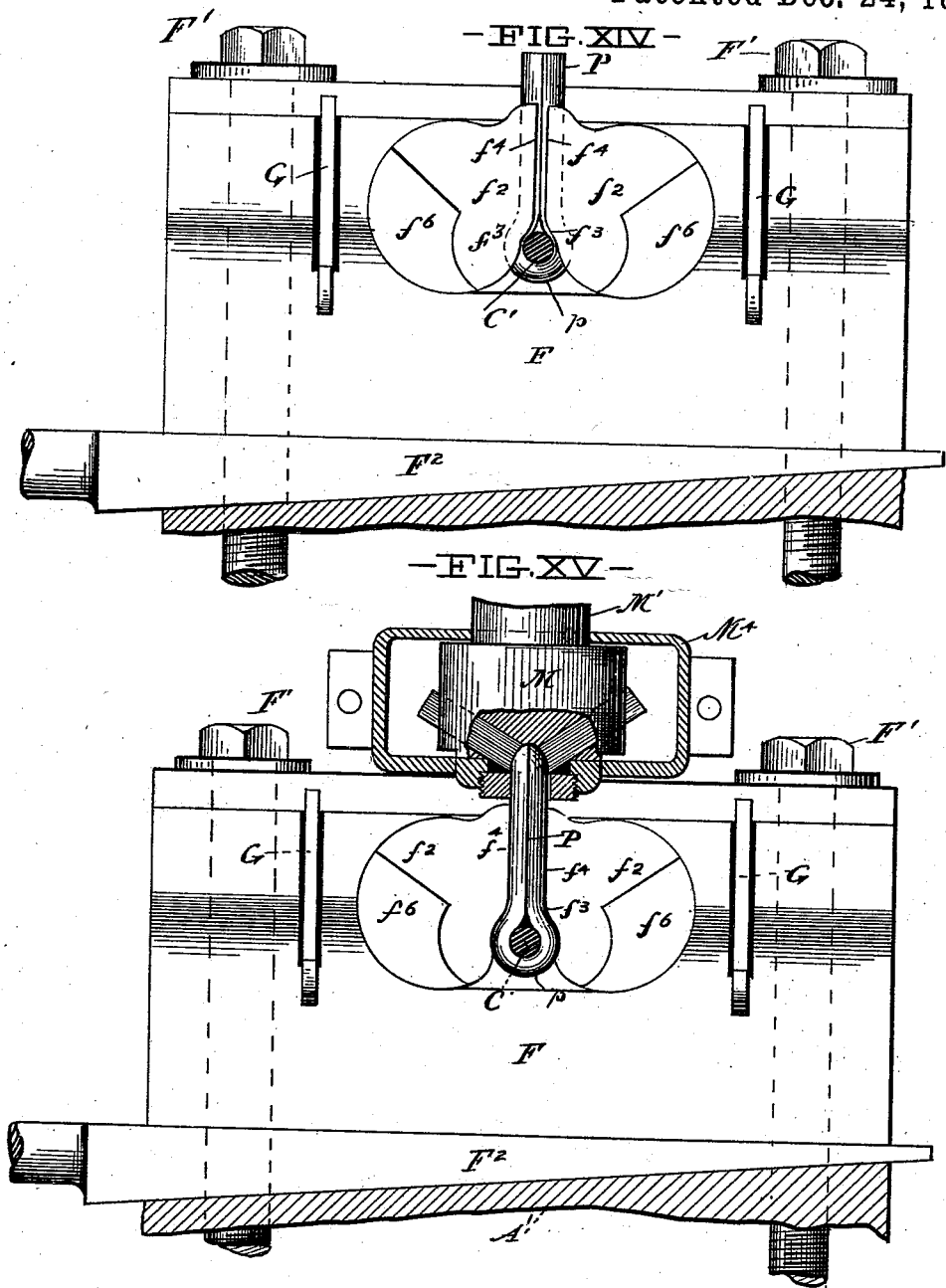

(No Model.)
F. P. CADY.
MACHINE FOR MAKING SPLIT KEYS.
No. 551,887. Patented Dec. 24, 1895.
FIG. XVI
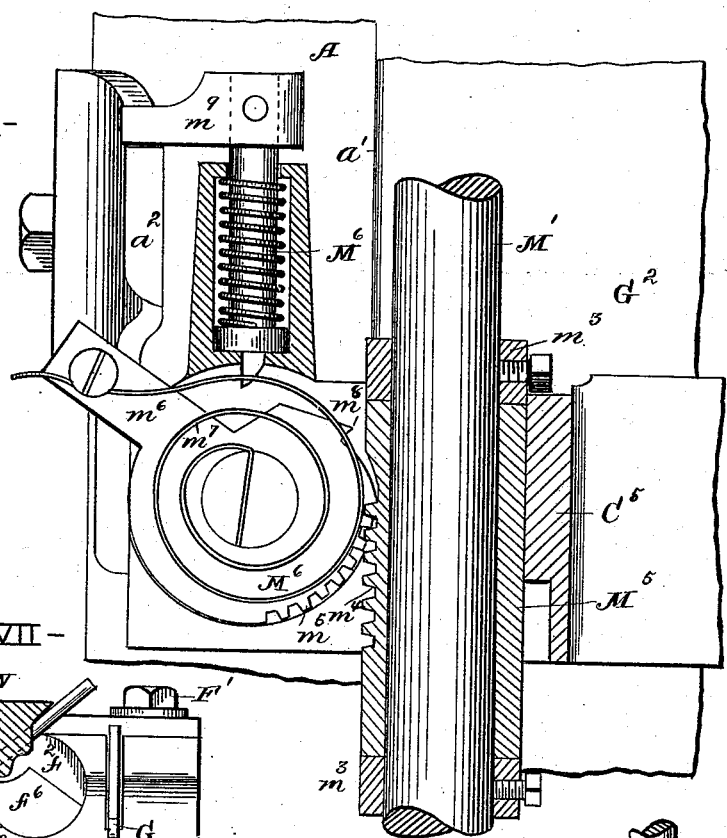
FIG. XVII
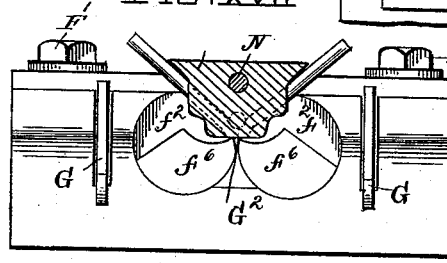
FIG. XVIII
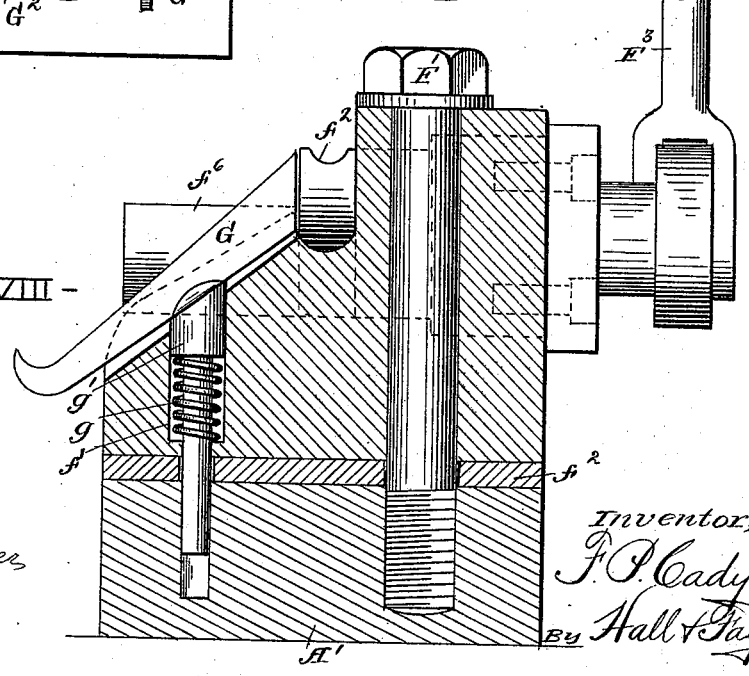
Witnesses,
J. C. Turner
Wm. Lecher
Inventor,
F. P. Cady
By Hall & Fay
Attys.

UNITED STATES PATENT OFFICE.

FRANK P. CADY, OF CLEVELAND, OHIO, ASSIGNOR TO THE STANDARD TOOL COMPANY, OF SAME PLACE.

MACHINE FOR MAKING SPLIT KEYS.

SPECIFICATION forming part of Letters Patent No. 551,887, dated December 24, 1895.

Application filed July 17, 1894. Serial No. 517,774. (No model.)

*To all whom it may concern:*

Be it known that I, FRANK P. CADY, a citizen of the United States, and a resident of Cleveland, county of Cuyahoga, and State of Ohio, have invented certain new and useful Improvements in Machines for Making Split Keys, of which the following is a specification, the principle of the invention being herein explained and the best mode in which I have contemplated applying that principle, so as to distinguish it from other inventions.

The annexed drawings and the following description set forth in detail one mechanical form embodying the invention, such detail construction being but one of various mechanical forms in which the principle of the invention may be used.

In said annexed drawings, Figure I represents a front elevation of my improved machine for making split keys; Fig. I$^a$, a sectional detail view of the driving mechanism for the milling-tool; Fig. II, a side elevation of said machine; Fig. III, an enlarged horizontal section; Fig. IV, a vertical section on the line IV IV in Fig. III of the lower portion of the plunger and of the opposed parts of the bending mechanism, illustrating the plunger in its depressed position; Fig. V, a vertical section on the line VI VI in Fig. III of the lower portion of the plunger and of the opposed parts of the bending and forming mechanism, illustrating the plunger in its depressed position; Fig. VI, a vertical section on the line VI VI in Fig. III of the same parts as illustrated in Fig. V, but illustrating the plunger in its raised position; Figs. VII, VIII, and IX, views of the three successive stages of the blank and finished split key; Fig. X, a detail view of the key-forming jaws and their gearing; Fig. XI, a vertical section on the line XI XI in Fig. X; Fig. XII, a perspective view of the key-forming jaws and the inclined guides for the same, illustrating the blank in position over the jaws and the jaws in position ready to perform the key-forming operation; Fig. XIII, a rear elevation of the parts illustrated in the previous view in the same relative positions and illustrating the pin which forms the eye in the split key in section and in position against the middle of the blank; Fig. XIV, a rear elevation of the same parts, illustrating the pin as depressed and the forming-jaws closed; Fig. XV, a rear elevation of the same parts in the same position as in the previous view, but illustrating the milling-tool in its operative position against the point of the key; Fig. XVI, a detail view of the mechanism for releasing the milling-tool; Fig. XVII, a sectional detail view of the key-forming jaws and of a portion of the plunger, illustrating the parts in the act of forming the split key; and Fig. XVIII, a sectional view of the key-forming mechanism and of the inclined guides for the key-blank.

An upright frame A is supported upon a bed-frame A', which preferably has legs A$^2$ for supporting it at a suitable height. A shaft B is journaled in the upper portion of the upright frame, and has a pulley B' at its rear end, to which pulley the power is applied. An eccentric-disk B$^2$ is secured upon the forward end of the shaft, and a connecting-rod C has an eccentric-strap C' at its upper end fitted upon the eccentric-disk, while its lower end is pivotally connected to a plunger C$^2$, which slides in vertical guides $a$ in the front face of the upright frame. The lower end of the plunger has a die C$^3$, the central bulge $c$ of which is shaped so as to form a bulge at the middle of the key-blank, which may form the eye of the split key when the latter is completed. A correspondingly-recessed female die D is supported upon the bed-plate beneath the movable die, and said stationary die D is directly in the path of the wire-stock, as the latter is intermittently fed between the dies and between a movable cutter C$^4$ and stationary cutter D' by means of two positively-driven feed-disks E, having raised feed-bulges $e$ upon their peripheries, which bulges feed the wire-stock and cut-away portions $e'$, which pass the stock without feeding the same. A distance forward of and at a somewhat higher level than the stationary bending-die D a groove $f$ is formed in the upper face of a block F and parallel with the groove in the stationary die D. Two inclined guides G extend from the die to the groove and have springs $g$ around their stems $g'$, which are seated in corresponding bores $f'$ in the block F, so that the guides may be yielding. A rigid end guide H and a yielding end guide H' are arranged at the sides of the inclined blank-guides G, so that the blank may be guided, with the ends in proper alignment, from the bending mechanism to the forming mechanism. A pusher J has shouldered ends $j$, which may engage the blank, so that the pusher may transfer the blank from the bending mechanism along the yielding guides and between the end guides. The pusher is pivoted at its rear end to the end of the upper arm of a bell-crank K, which is pivoted at its elbow to the rear of and below the stationary bending-die. A connecting-rod L is pivotally connected to the lower arm of the bell-crank by means of a stud $l$, sliding and turning in a slot $k$ in the arm of the bell-crank, and the upper end of said connecting-rod is pivotally connected to the plunger, so that the pusher is moved forward at each upward stroke of the plunger and retracted at each downward stroke, the slot in the bell-crank arm allowing the pusher to remain unmoved at the beginning of the upstroke and at the finishing part of the downstroke of the plunger. A pin $c'$ projects forward at the lower edge of the forward face of the plunger, and the eye of the key is formed around said pin, which strikes the middle of the bulge in the blank when the latter has been pushed into its forward position in the groove in the block F. Two forming-jaws $f^2$ are journaled in the block, one at each side of the path of the pin, and said jaws have their peripheries formed with concave portions $f^3$, which form the eye of the key, and with straight portions $f^4$, which form the limbs of the key. The jaws are connected to rotate in unison by means of pinions $f^5$, formed upon the journals forward of the jaws. Concave and curved projecting cams $f^6$ upon the rear faces of the jaws are engaged by a projection $c^2$ upon the lower end of the plunger, so that the jaws will be positively rotated to double and form the key when the plunger descends, the projection spreading the concave cams. The key-forming jaws are opened by means of a rod $F^3$, connected to the plunger and to an arm $F^4$, projecting from the journal of one of the jaws.

The block F is secured to the bed-frame by means of screw-bolts F', screwing into the bed-plate, and the block may be raised or lowered by unscrewing or screwing in said bolts and by longitudinally adjusting a wedge $F^2$ between the block and the bed-plate, said wedge having a screw-shank $f^7$, which passes between stationary lips $f^8$, against both sides of which nuts $f^9$ upon the screw-shank bear.

A milling-tool M for pointing the ends of the finished split key is secured to the lower end of a spindle M', which revolves and longitudinally slides in a bearing-bracket $a'$ upon the front of the upright frame. The upper portion of the spindle has a longitudinal groove $m$, into which a feather $m'$ in the central bore of a pulley $M^2$ may fit, so that the spindle may slide up and down in the bore of the pulley while it revolves with it. The pulley is driven by a belt $M^3$, receiving motion from any suitable source, preferably from the power which drives the machine. The milling-tool is preferably inclosed in a casing $M^4$, having a radially-projecting spout $m^2$, which conducts the chips or turnings away from that part of the machine where the key is formed and held while the milling-tool operates. The spindle of the milling-tool revolves in a sleeve $M^5$, which is held between two collars $m^3$, secured by set-screws upon the spindle so that the spindle may revolve in and slide with the sleeve. The sleeve is formed with a cogged rack $m^4$, which is engaged by cogs $m^5$ upon the periphery of a disk $M^6$, pivoted upon a bracket $C^5$ upon the face of the plunger and in which the sleeve slides. The cogged disk has a radially-projecting arm $m^6$, to which one end of a helical spring $m^7$ is secured, the other end of which spring is secured upon the pivot of the disk, so that the disk will tend to depress the sleeve, spindle, and milling-tool. The periphery of the disk has a notch $m^8$, which may be engaged by the end of a spring latch-bolt $M^6$, having a projecting arm $m^9$ upon its upper end. This arm and the arm of the disk may strike the opposite ends of a stop $a^2$, which projects from the face of the upright frame. When the plunger is raised, the spindle will be raised with it until the arm of the cogged disk strikes the lower end of the stop upon the frame, when the disk will be revolved to wind the spring and to raise the sleeve and spindle until the latch-bolt engages the notch in the disk. When the plunger descends, the spindle will descend with the plunger, but will be held back upon the plunger by the disk and latch-bolt until the arm upon the latch-bolt strikes the upper end of the stop upon the frame. The disk will thus be released from the bolt, and the spring will revolve the disk and throw the spindle and milling-tool down. An ejector-rod N slides in the lower portion of the plunger, and has a forked forward end $n$, which straddles the pin $c'$ upon which the eye of the split key is formed, so that said forked end may discharge the finished key from the pin when the ejector-rod is pushed forward. The rear end of the ejector-rod is pivotally connected to the lower arm of a two-armed lever N', which is fulcrumed upon the rear side of the plunger, and has a spring $n'$ bearing against its upper arm. The upper arm of the lever has a rearwardly-projecting nose-piece $n^2$, which bears against a bracket $N^2$, having an inset $n^3$, so that the bracket may hold the lever in one position and the ejector retracted at one portion of the up and down stroke of the plunger, and may allow the lever to be rocked by its spring to throw the ejector forward when the nose-piece arrives at the inset. The ejector-rod has a notch $n^4$, which is engaged by a bolt $N^3$, having a spring $n^5$, which forces it down, so that the ejector may be held securely from moving forward. The bolt has a collar $n^6$, which may be engaged by a bracket $n^7$, projecting from the milling-tool spindle, so that the ejector will not be thrown forward until the plunger and milling-tool have been raised sufficiently high to be clear of the finished key. A stop O is adjustably secured opposite the cutters which sever the blank from the wire-stock, at a distance from the centers of the bending-dies equal to the distance of the cutters from said centers, so as to stop and gage the length of the blank to be severed.

In practice the half-round wire or rod from which split keys or cotters are made is suitably supported in the form of a coiled bundle upon a reel or drum to one side of the machine, and the end of the stock is carried between the feed-disks, which, on account of their construction with the raised feed-bulges, will intermittently feed the stock forward until the end of the same strikes the stop or gage O. The cutters will sever a blank P from the stock, and the bending-dies, which act upon the blank immediately after it has been severed, will make the preliminary bend $p$ at the middle of the blank, said indentation having shoulders at the ends, and being substantially parallel with the line of the otherwise straight blank. As soon as the plunger ascends, the preliminarily-bent blank is pushed from the stationary bending-die upon the straight portions of the forming-jaws, the blank sliding upon the yielding and inclined guides and between the end guides which insure the delivery of the blank in its proper position with its bent or indented central portion in the space between the inner ends of the straight portions of the forming-jaws. While the preliminarily-bent blank is pushed over upon the forming-jaws, another length of stock is fed upon the bending-die, to be acted upon in the same manner as the first blank. When the plunger again descends, the pin upon the forward face of the plunger will bear against the middle of the blank and depress that portion, while the forming-jaws will double the blank and form the split key, the eye being formed around the pin. The preliminary bend which the blank has received will facilitate the perfect formation of the eye. It is not, however, so much by the depressing action of the pin that the key is formed as by the action of jaws doubling the stock, said jaws being actuated by the projection upon the plunger bearing against the cams upon the jaws. While the first bent blank is formed into a key by the forming-jaws, the length of stock fed upon the bending-jaws receives its preliminary bend. When the limbs of the split key have been doubled close together, the trip for the milling-tool will release the latter, allowing it to descend and point the ends of the limbs of the key. As the plunger again ascends, the finished key is carried upward by the pin around which its eye is formed, and the ejector will be actuated to discharge the finished key over the forward edge of the block containing the forming mechanism.

After the machine is started, it will make one finished split key at each down and up reciprocation of the plunger, two blanks being subjected at one time in the machine, respectively to their preliminary and final treatment.

Other modes of applying the principle of my invention may be employed for the mode herein explained. Change may therefore be made as regards the mechanism thus disclosed, provided the principles of construction set forth respectively in the following claims are employed.

I therefore particularly point out and distinctly claim as my invention—

1. In a machine for making split keys, the combination of bending dies shaped to impart a preliminary bend or indentation to the central portion of the blank, and forming tools constructed to double the blank at its middle and to thereby form the indented central portion into the eye of the key, substantially as set forth.

2. In a machine for making split keys, the combination of bending dies shaped to impart a preliminary bend or indentation to the middle of the blank, a pin constructed to bear against the middle of the blank and to support the eye during the formation of the key, and forming tools constructed to double the blank upon its middle around said pin, substantially as set forth.

3. In a machine for making split keys, the combination of bending dies shaped respectively with a depression and a projection in a line parallel with the remaining surfaces, forming tools constructed to double the blank upon its middle, and a pin constructed to bear against the middle of the blank and to have the eye formed around it, substantially as set forth.

4. In a machine for making split keys, the combination of bending dies shaped to impart a preliminary bend or indentation to the middle of the blank, forming tools constructed to double the blank upon its middle, and a transferring device for transferring the blank from the bending dies to the forming tools, substantially as set forth.

5. In a machine for making split keys, the combination of bending dies shaped to impart a preliminary bend or indentation to the middle of the blank, forming tools arranged transversely opposite said bending dies and constructed to double the blank upon its middle, and a pusher constructed to transversely transfer the blank from the bending dies to the forming tools, substantially as set forth.

6. In a machine for making split keys, the combination of bending dies adapted to impart a preliminary bend or indentation to the middle of the blank, forming tools arranged transversely opposite said bending dies and constructed to double the blank upon its middle, guides for the blank between said dies and tools, and a pusher constructed to transversely transfer the blank upon the guides from the bending dies to the forming tools, substantially as set forth.

7. In a machine for making split keys, the combination of bending dies adapted to impart a preliminary bend or indentation to the middle of the blank, forming tools arranged transversely opposite said bending dies and constructed to double the blank upon its middle, guides for supporting the blank from below between said dies, end guides for the ends of the blank, and a pusher constructed to transfer the blank from the bending dies to the forming tools, upon the first-mentioned guides and between the end guides, substantially as set forth.

8. In a machine for making split keys, the combination of a stationary bending die, a reciprocating plunger having a bending die constructed to co-operate with the stationary die to impart a preliminary bend or indentation to the blank, forming jaws arranged parallel to the stationary bending die and constructed to double the blank at its middle and to be actuated by the descending plunger, guides between the stationary bending die and the forming jaws, and a pusher constructed to transfer a blank over the guides from the stationary bending die to the forming jaws and connected to be so actuated by the ascending plunger, substantially as set forth.

9. In a machine for making split keys, the combination of means for intermittently feeding wire stock, a stationary cutter in the line of the feed, a stationary bending die in the line of the feed, a stationary stop in the line of the feed, a reciprocating plunger having a bending die constructed to co-operate with the stationary die to impart a preliminary bend or indentation to the blank and a cutter for co-operating with the stationary cutter to sever the stock into blanks, forming jaws arranged parallel to the stationary bending die and constructed to double the blank at its middle and to be actuated by the descending plunger, guides between the stationary bending die and the forming jaws, and a pusher constructed to transfer a blank over the guides from the stationary bending die to the forming jaws and connected to be so actuated by the ascending plunger, substantially as set forth.

10. In a machine for making split keys, the combination of a reciprocating plunger, forming jaws constructed to double the blank and to be so actuated by the descending plunger, a milling tool constructed to slide with and upon the plunger to point the end of the formed key while the latter is held in the jaws, a spring constructed to force the tool against the key, a trip upon the plunger and constructed to retain the milling tool against the spring, and a rigid stop in the path of the trip, substantially as set forth.

11. In a machine for making split keys, the combination of jaws constructed to hold the formed key, a reciprocating plunger, a milling tool journaled with its spindle upon said plunger to reciprocate with and upon the same, a cogged sleeve in which the spindle of the tool revolves and sliding in a bearing upon the plunger, means for retaining the sleeve and spindle from sliding one upon the other, a disk pivoted upon the plunger and having cogs engaging the sleeve and a projecting arm upon its periphery and a notch in the same, a spring connected to rotate the disk to depress the sleeve and tool spindle, a spring bolt upon the plunger and engaging the notch in the disk and having a projection, and a rigid stop adapted to be engaged by the projection upon the spring bolt at the descent of the plunger and by the arm of the disk at the ascent of the plunger, substantially as set forth.

12. In a machine for making split keys, the combination of a reciprocating plunger having a pin projecting from its face, forming jaws constructed to double the blank with the eye around the pin upon the plunger, an ejector rod sliding in the plunger and having its forked end straddling the pin, a lever pivoted upon the plunger and having one arm pivoted to the ejector rod and formed with a nose, a stationary bracket against which said nose bears and formed with an inset into which the nose may enter, and a spring bearing to force the nose against the bracket, substantially as set forth.

13. In a machine for making split keys, the combination of a reciprocating plunger having an eye forming pin upon its face, forming jaws constructed to double the key blank, an ejector straddling the pin and having means for actuating it at the upper portion of the up-stroke of the plunger and formed with a notch, a milling tool journaled to slide with and upon the plunger and having means for causing it to act upon the end of the key at the last portion of the down-stroke of the plunger and at the first portion of the up-stroke of the same, and a spring actuated bolt engaging the notch in the ejector and constructed to be pulled by the milling tool at the last portion of the up-stroke of the plunger, substantially as set forth.

14. In a machine for making split keys, the combination of a reciprocating plunger having an eye forming pin upon its face, forming jaws adapted to double the blank upon its middle and around said pin at the down-stroke of the plunger, a spring actuated milling tool journaled to slide with and upon the plunger and having means for releasing it to act upon the end of the key at the last part of the down-stroke of the plunger and at the first part of the up-stroke of the same and having means for raising it at the last point of the up-stroke of the plunger, an ejector straddling the pin upon the plunger and having means for forcing it outward at the last portion of the up-stroke of the plunger and formed with a rod sliding in the plunger and having a notch, a bolt in the plunger and engaging the notch in the ejector rod and provided with a spring for forcing it downward, and a bracket upon the milling tool engaging a collar upon said spring bolt to withdraw the same when the milling tool is raised from the end of the key, substantially as set forth.

In testimony that I claim the foregoing to be my invention I have hereunto set my hand this 13th day of July, A. D. 1894.

FRANK P. CADY.

Witnesses:
 WM. SECHER,
 J. C. TURNER.